United States Patent [19]

Taniguchi et al.

[11] Patent Number: 5,046,372
[45] Date of Patent: Sep. 10, 1991

[54] TORQUE SENSOR

[75] Inventors: Manabu Taniguchi; Hidenobu Nagano; Toshihiko Daido; Isao Kuramoto; Makoto Nohara; Hirochika Ueyama, all of Osaka, Japan

[73] Assignee: Koyo Seiko Co., Ltd., Osaka, Japan

[21] Appl. No.: 417,279

[22] Filed: Oct. 5, 1989

Related U.S. Application Data

[63] Continuation-in-part of Ser. No. 224,538, Jul. 26, 1988, Pat. No. 4,907,460.

[30] Foreign Application Priority Data

| Oct. 30, 1987 | [JP] | Japan | 62-167137 |
| Nov. 26, 1987 | [JP] | Japan | 62-299593 |
| Dec. 25, 1987 | [JP] | Japan | 62-198734 |
| Mar. 25, 1988 | [JP] | Japan | 63-72270 |
| Mar. 25, 1988 | [JP] | Japan | 63-72269 |
| Mar. 25, 1988 | [JP] | Japan | 63-39842 |
| Apr. 22, 1988 | [JP] | Japan | 63-54841 |

[51] Int. Cl.$^5$ .............................................. G01L 3/10
[52] U.S. Cl. ................................................. 73/862.33
[58] Field of Search ................ 73/862.33; 324/207.25, 324/207.22

[56] References Cited

U.S. PATENT DOCUMENTS

| 2,470,626 | 5/1949 | Langer et al. | 73/862.33 |
| 2,498,282 | 2/1950 | Langer | 73/862.33 |
| 4,712,432 | 12/1987 | Hochstein et al. | 73/862.33 |
| 4,907,460 | 3/1990 | Taniguchi et al. | 73/862.33 |

FOREIGN PATENT DOCUMENTS

| 532022 | 10/1976 | U.S.S.R. | 73/862.33 |
| 564147 | 7/1977 | U.S.S.R. | 73/862.33 |

Primary Examiner—Charles A. Ruehl
Attorney, Agent, or Firm—Darby & Darby

[57] ABSTRACT

A torque sensor which includes two cylinders fixed to two shafts connected with each other through a torsion bar. The magnetic coupling state of the two cylinders is made variable corresponding to relative rotations of the two shafts. The magnetic coupling state thereof is detected by a coil impedance, which is indicative of a torque acting on the shafts. The two cylinders form at the opposite end edges thereof teeth provided with cutouts disposed circumferentially of the cylinders and are opposite to each other at portions of about half a width of each tooth. The two shafts are regulated by rotation so as to not put the teeth of the cylinders completely opposite or non-opposite to each other.

13 Claims, 6 Drawing Sheets

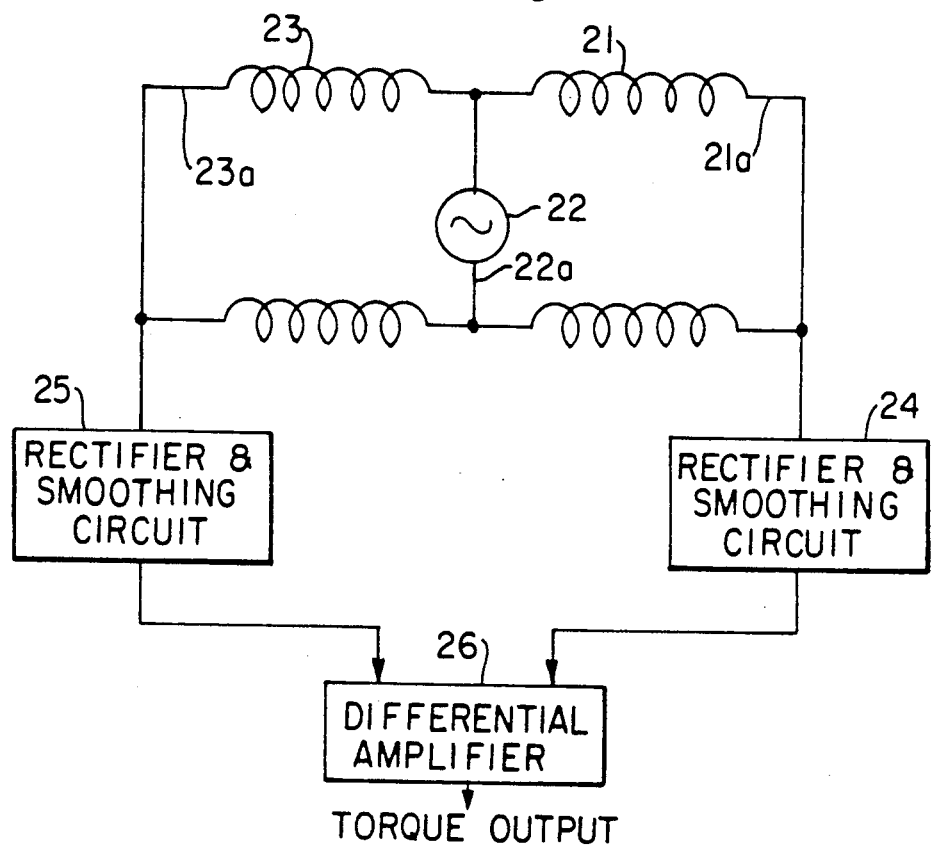
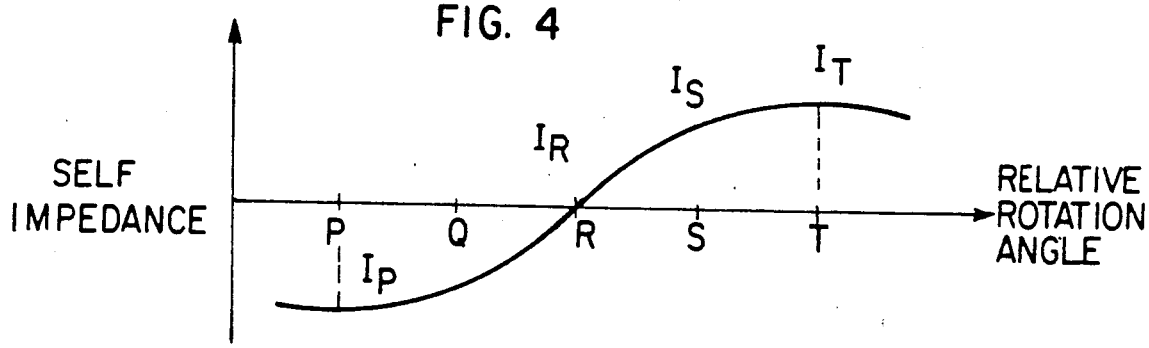
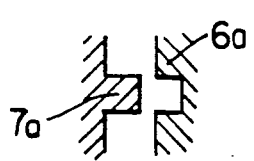 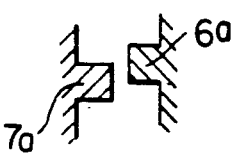 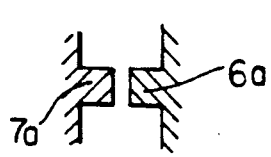

TORQUE SENSOR

This is a continuation-in-part patent application of Ser. No. 07/224,538 filed on July 26, 1988, now Pat. No. 4,907,460.

BACKGROUND OF THE INVENTION

1. Field of the Invention

The present invention relates to a torque sensor, and more particularly to a torque sensor suitable to be applied to an electric power steering apparatus for an automobile.

2. Description of the Prior Art

An electric power steering apparatus has been developed that assists the power to operate a steering wheel of the automobile. It is constructed so as to detect a torque applied to the steering wheel and rotate an electric motor provided at a steering mechanism corresponding to the detected torque.

As the torque detection means, a torque detecting apparatus disclosed in, for example, the Japanese Patent Laid-Open Gazette No. Sho 59-208431, is well-known. FIG. 1 is a partially cutaway perspective view of the torque detecting apparatus. The torque detecting apparatus comprises a shaft 40 to be measured which is of joint construction of two shafts 41 and 42 connected through a torsion bar 46 in spline-connection and engageable with each other through a predetermined gap d. Also the apparatus has a tubular member 45 of magnetic material covering the outer periphery of the joint at the shaft to be measured 40 and fixed to both axes 41 and 42. In addition, the apparatus has an exciting coil (not shown) disposed outside the tubular member 45 to alternately magnetize the tubular member 45 in the predetermined direction. The apparatus also has a detecting coil (not shown) outputting the magneto striction component corresponding to a torque from the magnetic flux flowing in the tubular member 45.

When the torque applied to the shaft to be measured 40 is relatively small, the torque detecting apparatus applies a torsional moment to the tubular member 45 and a smaller diameter portion of torsion bar 46 by play existing between engaging pawls 43, 44 of the shafts 41, 42. Thereby a torsion amount changes with respect to a fine torque. On the other hand, when the torque is relatively larger, the engaging pawls 43 and 44 abut against each other and the torsional moment acts also on the tubular member 45, the smaller diameter portion of torsion bar 46, and shafts 41 and 42. Therefore, strength with respect to the torsional moment abruptly increases to reduce variation in the torsional amount of tubular member 45 with respect to variation in torque. A rate of change of the detection output of the magneto striction component for the torque is less than that when the engaging pawls 43 and 44 abut against each other, thereby enabling detection with high accuracy.

However, the torsional amount of the shaft to be measured 40, when the shaft to be measured 40 is subjected to the torque by steering, is extremely minute, whereby variation in the circumferentially opposite gap d between the engaging pawls 43 and 44 at the aforesaid torque detecting apparatus is a little. Variation in the magneto striction component flowing in the tubular member 45 corresponding to torque variation, that is, variation in the torque detection signal, is reduced. This created the problem in that sensitivity with respect to the torque variation acting on the shaft to be measured 40 is low and does not properly assist a steering force. Also in that the cylindrical tubular member 45 generates at the peripheral surface an eddy current to deteriorate the sensor output.

On the other hand, when a torque sensor is assembled while applying torsion to the torsion bar 46 during the assembly process, the circumferentially opposite gap d varies, thereby creating the problem in that a detection signal varies by the factor other than torque acting on the torsion bar 46.

Also variation in ambient temperature causes the opposite site gap d to expand or contract, thereby creating the problem in that when the ambient temperature varies, the detection signal varies.

SUMMARY OF THE INVENTION

In order to solve the aforesaid problems in the prior art, the present invention has been designed.

A first object thereof is to provide a torque sensor which is provided with a cylinder whose magnetic coupling state is not variable with respect to one of two cylinders whose magnetic coupling state is variable, thereby enabling variation in torque to be detected with high sensitivity.

A second object of the invention is to provide a torque

A second object of the invention is to provide a torque sensor which is provided at the outer periphery of each cylinder with a large number of grooves extending axially, thereby cutting off an eddy current flowing on the outer periphery of the cylinder and restraining a generation of heat caused by an eddy current loss.

A third object of the invention is to provide a torque sensor in which one of the opposite cylinders is made at the axial end edge smaller in thickness than the other, or a cylindrical member fixing the opposite cylinders is supported on a casing through a bearing, thereby eliminating the influence of deflection of the torsion bar.

A fourth object of the invention is to provide a torque sensor which is provided at the end edges of opposite cylinders with a large number of cutouts so as to form teeth whose opposite ends are opposite at about a half width thereof to each other. Regulation means are provided for regulating the teeth to be not completely opposite or not opposite even when subjected to a steering torque, thereby obtaining a large and stable rate of impedance change of a magnetic coupling detecting coil and also obtaining a detection output not different in the lateral direction.

A fifth object of the invention is to provide a torque sensor in which two cylinders which are non-variable of the magnetic coupling state are made identical at the opposite end edges in configuration with those of two cylinders variable of the same, thereby enabling a proper torque to be detected without being affected by ambient temperature.

The above and further objects and features of the invention will more fully be apparent from the following detailed description with accompanying drawings.

BRIEF DESCRIPTION OF THE DRAWINGS

FIG. 3 is a block diagram showing an electric circuit of the torque sensor of the invention, FIG. 4 is a graph showing the relation between the relative rotary angle and the induced voltage, FIGS. 4a, 4b and 4c are sectional views showing the opposite state of teeth in association with points P, R and T of the graph of FIG. 4.

DESCRIPTION OF THE PREFERRED EMBODIMENTS

Figure 1:
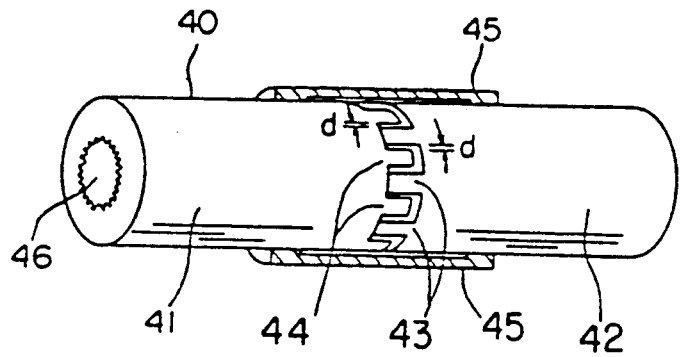
FIG. 1 is a partially cutaway perspective view of the conventional torque sensor.
Figure 2:
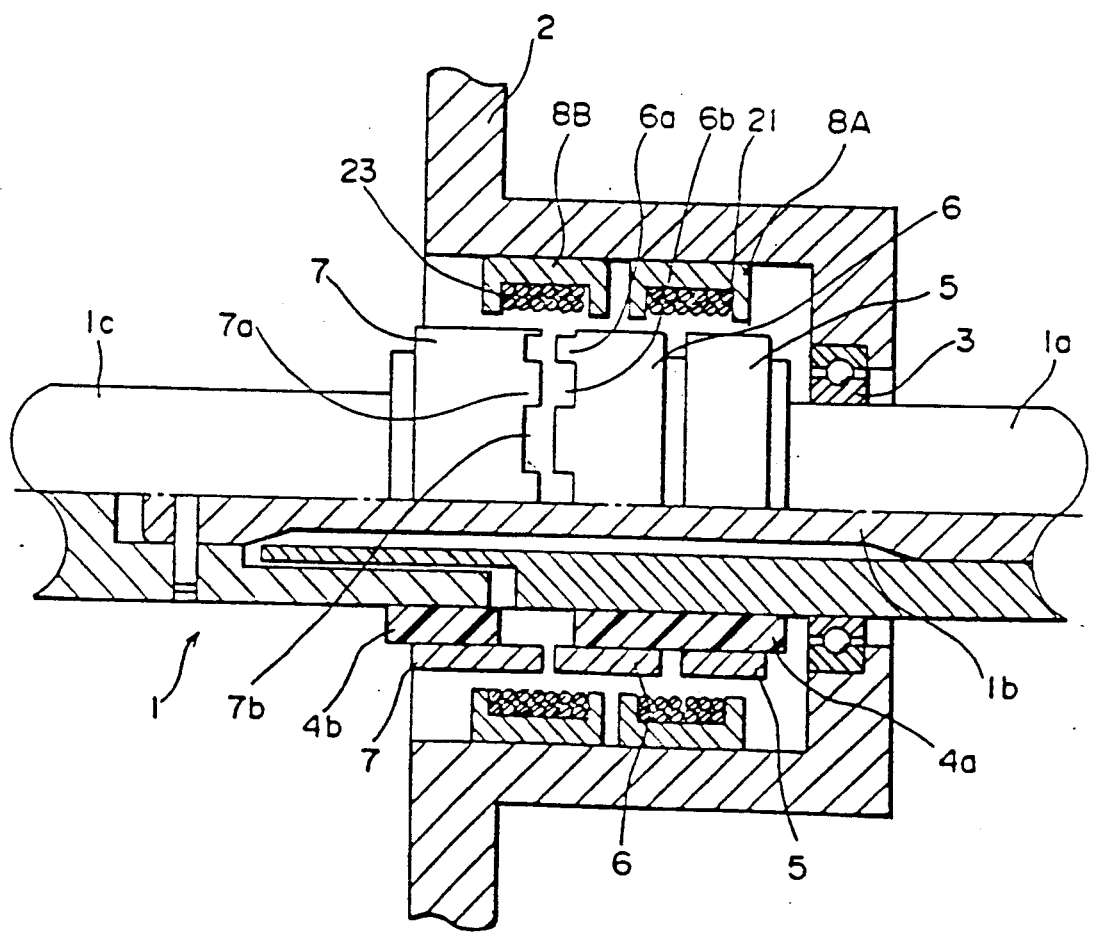
FIG. 2 is a half sectional view of a first embodiment of a torque sensor of the invention.

Next, embodiments of the torque sensor of the invention will be detailed with reference to the drawings. In FIG. 2, an input shaft 1 comprises an upper shaft 1a carrying a steering wheel (not shown) and a lower shaft 1c to which a steering mechanism is mounted. The upper shaft 1a and lower shaft 1c are coaxially connected. The upper shaft 1a is rotatably supported through a bearing 3 on a cylindrical casing 2 mounted to a car body. A first sleeve 4a of non-magnetic material is fixedly fitted onto the lower end (the left side in the drawing) of the upper shaft 1a and first and second cylinders 5 and 6 of magnetic material are fixedly fitted onto the outer periphery of the sleeve 4a and axially spaced at a proper interval.

The first cylinder 5 has upper and lower end faces flat and perpendicular to the axis of the input shaft 1. The second cylinder 6 has an upper end face opposite and parallel to the lower end face of the cylinder 5, and a large number of square teeth 6a are formed at the lower end face of the cylinder 6 at circumferentially equal pitches.

The number of teeth 6a is preferably about 8, and a tooth width of each of the teeth 6a is selected to be about equal to a cutout between each of the teeth 6a.

On the upper end (the right side in FIG. 2) of the lower shaft 1c is fixedly fitted a second sleeve 4b of non-magnetic material and at the outer periphery thereof is fixedly fitted a third cylinder 7 of magnetic material. At the upper end edge of the cylinder 7 are formed a large number of teeth 7a equal in width, similar in configuration and equal in pitch. The teeth 6a and 7a, when the torsion bar 1b is subjected to no torque, are opposite to each other at a portion of a proper width of each of the teeth.

At the inner periphery of the casing 2 are fixedly fitted cylindrical members 8A and 8B of U-like shape in section and having two inward flanges respectively. The cylindrical member 8A extends longitudinally across both the cylinders 5 and 6, and at the center of axial length of the same, the cylinders 5 and 6 are opposite to each other. The cylindrical member 8B extends axially length across the cylinders 6 and 7, and at the center of axial length of the same, the cylinders 6 and 7 are opposite to each other. On the cylindrical members 8A and 8B are wound a temperature compensating coil 21 and a magnetic coupling detecting coil 23, the coils 21 and 23 being connected to an oscillator (not shown in this drawings) so that the temperature compensating coil 21 electromagnetically couples with the cylinders 5 and 6 and the magnetic coupling detecting coil 23 with the cylinders 6 and 7 respectively.

The self impedance of the magnetic coupling detecting coil 23 is responsive to the opposite area between the teeth 6a at the cylinder 6 and that 7a at the cylinder 7, in other words, the magnetic coupling state. Therefore, the upper shaft 1a is rotated to twist the torsion bar 1b, the opposite area between the teeth 6a and 7a changes, whereby a torque acting on the torsion bar 1b is detected from the self impedance in the magnetic coupling detecting coil 23.

FIG. 3 is a block diagram of an electric circuit at the torque sensor of the invention, in which a first magnetic coupling detecting coil 21 and a second magnetic coupling detecting coil 23 are connected to form a bridge with other two coils and the coils 21 and 23 are connected in series. An oscillator 22 is connected between the connecting node of coils 21 and 23 and the connecting node of other two coils. Other two nodes are connected to a first rectifier and smoothing circuit 24 and a second rectifier and smoothing circuit 25. The outputs of the first and second rectifier and smoothing circuits 24, 25 are given to a differential amplifier 26, an output of the amplifier 26 serving as the torque output.

Next, explanation will be given on operation of the torque sensor of the invention.

The oscillator 22 oscillates so that the magnetic flux generated at the first magnetic coupling detecting coil 21 and the second magnetic coupling detecting coil 23 interlinks the cylinders 5 and 6 and those 6 and 7. Therefore, the self impedance of the coil 21 is affected by the magnetic coupling of the cylinders 5 and 6, and that of the coil 23 is affected by that of cylinders 6 and 7. The first and second magnetic coupling detecting coils 21 and 23 are made equal in the number of turns and the sensor's cores 8A and 8B are made about equal in volume to each other. Nevertheless the self impedance of first and second magnetic coupling detecting coils 21 and 23 are hardly equal. Then, in a state where the torsion bar 1b is subjected to non torque, a potentiometer (not shown) is adjusted to make zero the output of the differential amplifier 26.

The torque sensor of the invention is used in such an adjusted state.

As shown in FIG. 2, the steering wheel is rotated clockwise so that the torsion bar 1b operates to allow the cylinder 6 to rotate clockwise relative to the cylinder 7, thereby varying the opposite area of the teeth 6a to those 7a. As a result, the magnetic coupling varies to vary the self impedance of the second magnetic coupling detecting coil 23. In contrast, the electromagnetic coupling with the first magnetic coupling detecting coil 21 and the cylinders 5 and 6 is unchanged. Thus the self impedance of the first magnetic coupling detecting coil 21 is constant, and, when the torsion bar 1b is subjected to torque, the bridge becomes unbalanced and the output of differential amplifier circuit 26 shows a value corresponding to the torque or the aforesaid relative rotation difference.

The relative rotation amount depends on a torque applied to the input shaft 1 by the steering wheel, so that lastly the output of the differential amplifier circuit 26 enables the torque to be detected.

The magnetic flux generated by the first magnetic coupling detecting coil 21 flows in a closed magnetic path formed of the sensor core 8A and the first and second cylinders 5 and 6. The magnetic flux generated by the second magnetic coupling detecting coil 23 flows in a closed magnetic path formed of the sensor core 8B and the second and third cylinders 6 and 7. The respective magnetic flux are such that they do not interfere with each other and no leakage magnetic flux is generated. Furthermore, even when the external magnetic field generates the magnetic flux at, for example, a column shaft, the magnetic flux never flows in the sensor cores 8A and 8B. Hence, the torque output can be obtained with high accuracy and high sensitivity without interference of the external magnetic field and generated magnetic flux.

Thus, the relative rotation of the cylinders 6 and 7 changes the opposite area between the teeth 6a and 7a at the axial end faces of cylinders 6 and 7, so that the magnetic coupling state therebetween largely varies. Therefore, even when the relative rotation amount is a little, the torque detection signal largely varies corresponding to a change in torque.

FIG. 4 is a graph showing the relation between the relative rotation angle and the self impedance of the second magnetic coupling detecting coil 23, in which the self impedance is represented by the axis of ordinate and the relative rotation angle by the axis of abscissa. The self impedance of the magnetic coupling detecting coil 23, as shown in FIG. 4, varies by the relative rotation angle of the cylinder 6 to that 7. In other words, the self impedance $I_P$ at the relative rotation angle P between the teeth 6a and 7a asymmetrical to each other (FIG. 4a) is the smallest. The self impedance at a relative rotation angle R where the teeth 6a and 7a are opposite at a half tooth width to each other (FIG. 4b) is $I_R$ and the self impedance at a relative rotation angle T where the teeth 6a and 7a are completely opposite (FIG. 4c) is the largest $I_T$. The self impedance $I_Q$, $I_S$ at the relative rotation angles Q and S are somewhat larger than $I_P$ and somewhat smaller than the voltage $I_T$. Thus, the impedance of the magnetic coupling detecting coil 23 changes in a sinusoidal waveform corresponding to the relative rotation angle of the cylinder, whereby the self impedance is different in the rate of change by the relative rotation angle.

Next, explanation will be given on a second embodiment of the torque sensor of the invention.

Figure 5:
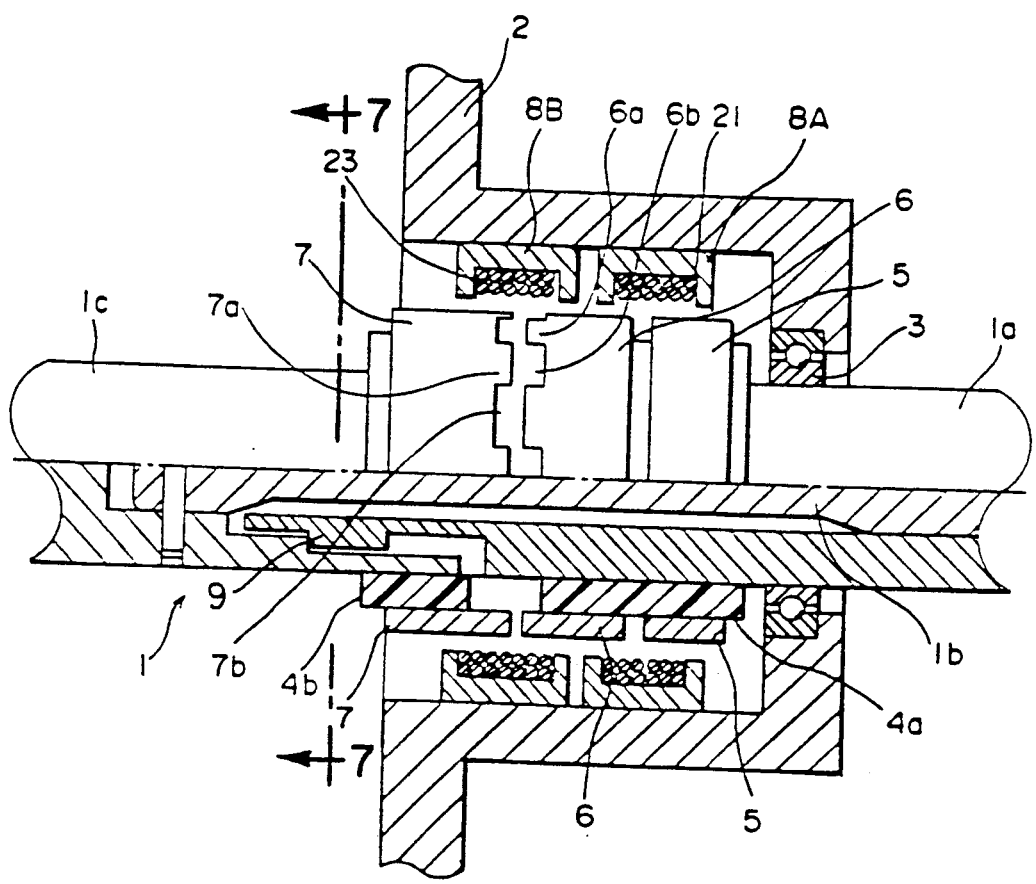
FIG. 5 is a half sectional view showing structure of a second embodiment of the torque sensor of the invention.

FIG. 5 is a half sectional view thereof, in which an input shaft 1 comprises an upper shaft 1a mounting a steering wheel (not shown) and a lower shaft 1c mounting a steering mechanism (not shown), both the shafts 1a and 1c being coaxially connected through a torsion bar 1b, the upper shaft 1a being rotatably supported through a bearing 3 on a cylindrical casing 2 mounted on the car body. Onto the lower end (the left side in the drawing) is fixedly fitted a first sleeve 4a of non-magnetic material and onto the outer periphery thereof is fixedly fitted first and second cylinders 5 and 6 of magnetic material spaced at a proper axial interval.

The first cylinder 5 has the upper and lower end faces flat and perpendicular to the axis of input shaft 1. The second cylinder 6 has the upper end face opposite to and parallel to the lower end face of the first cylinder 5, the second cylinder 6 forming a large number of teeth 6a square and equal in height and in circumferentially equal pitch. Each of the teeth 6a is selected to be smaller in width than a cutout 6b between the teeth 6a.

Figure 6A:
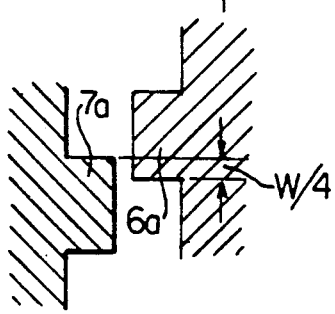
FIGS. 6a, 6b and 6c are an enlarged sectional views showing the opposite state of teeth.
Figure 6B:
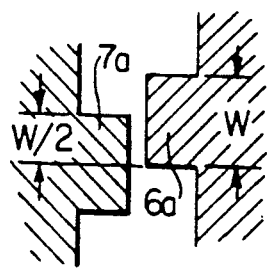
Figure 6C:
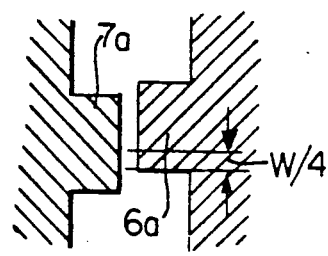
Figure 7:
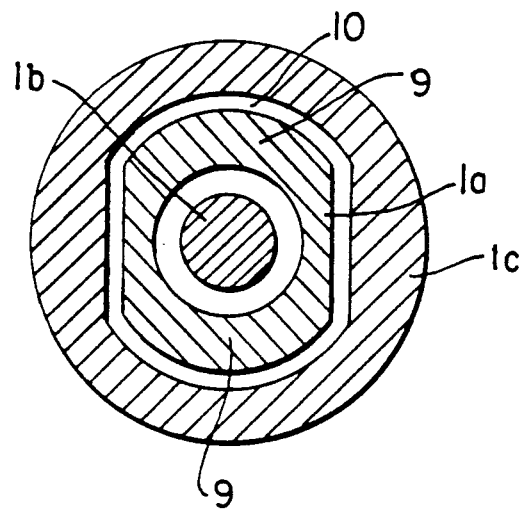
FIG. 7 is an enlarged sectional view at the line 7—7 in FIG. 5.

A second sleeve 4b of non-magnetic material is fixedly fitted onto the upper end (the right side in the drawing) of the lower shaft 1c and a third cylinder 7 is fixedly fitted onto the outer periphery of the second sleeve 4b. At the upper end of the cylinder 7 are formed a large number of teeth 7a equal in width, configuration and pitch to that formed in the cylinder 6. FIGS. 6a, 6b and 6c and enlarged side views showing the opposite condition of the teeth. These cylinders 6 and 7, when the torsion bar 1b is not subjected to torque, are circumferentially positioned in such a manner that the teeth 6a and 7a are opposite to each other at the portions W/2 of about a half of tooth width W as shown in FIG. 6b At the outer periphery of the portion of the upper shaft 1a properly upwardly spaced from the lower end is provided a stopper 9 projecting radially and extending lengthwise in parallel to the upper shaft 1a itself. On the other hand, at the inner periphery of the upper end of the lower shaft 1c is formed a stopper guide groove 10 being deep enough to engage with the stopper 9. FIG. 7 shows an enlarged sectional view at the line 7—7 in FIG. 5. The stopper guide groove 10 has a circumferential length selected to allow the upper and lower shafts 1a and 1c to relative-rotatable only by a half length of tooth width of tooth 6a or 7a.

The stopper 9 engages with the stopper guide groove 10, which abuts against the circumferential end of the guide groove 10 to restrain the relative rotation of the upper shaft 1a to the lower shaft 1c.

The torque sensor constructed as above-mentioned, when the torsion bar 1b is not subjected to torque, as shown in FIG. 6b, the teeth 6a of cylinder 6 are opposite to the teeth 7b of cylinder 7 at the portion of length W/2 half of tooth width W. In this state, the self impedance of the magnetic coupling detecting coil 23 is $I_R$ at the relative rotation angle R shown in FIG. 4. The self impedance $I_R$ means no torque.

In a case where the upper shaft 1a is rotated in the direction of the solid arrow shown in FIG. 5 and the stopper 9 is moved to the one circumferential end of the stopper guide groove 10, the teeth 6a move in the direction of the arrow as shown in FIG. 6a, the teeth 6a and 7a are opposite to each other at a portion of length W/4 of a quarter of tooth width W. In this state, the self impedance of the magnetic coupling detecting coil 23 is $I_Q$ at the relative rotation angle Q shown in FIG. 4. On the other hand, the upper shaft 1a is rotated in the direction of the arrow in the broken line and the stopper 9 is moved to the other circumferential end of guide groove 10. The teeth 6a, as shown in FIG. 6c, move in the direction of the arrow and the teeth 6a and 7a are opposite to each other at a portion of length 3W/4 of ¾ of tooth width W. In this state, the self impedance of the magnetic coupling detecting coil 23 is $I_S$ at the relative rotation angle S shown in FIG. 4.

Accordingly, in a range of rotation angle between the relative rotation angles Q and S, the self impedance of the magnetic coupling detecting coil 23 varies about linearly with respect to the relative rotation angle and the rate of change of the self impedance becomes about constant, thereby enabling the torque to be detected with high sensitivity. When no torque is applied to the torsion bar 1b, the teeth 6a and 7a at the cylinders 6 and 7 are opposite to each other at the portion of length of about ½ of tooth width W.

Next, explanation will be given on a third embodiment of the invention.

Figure 8:
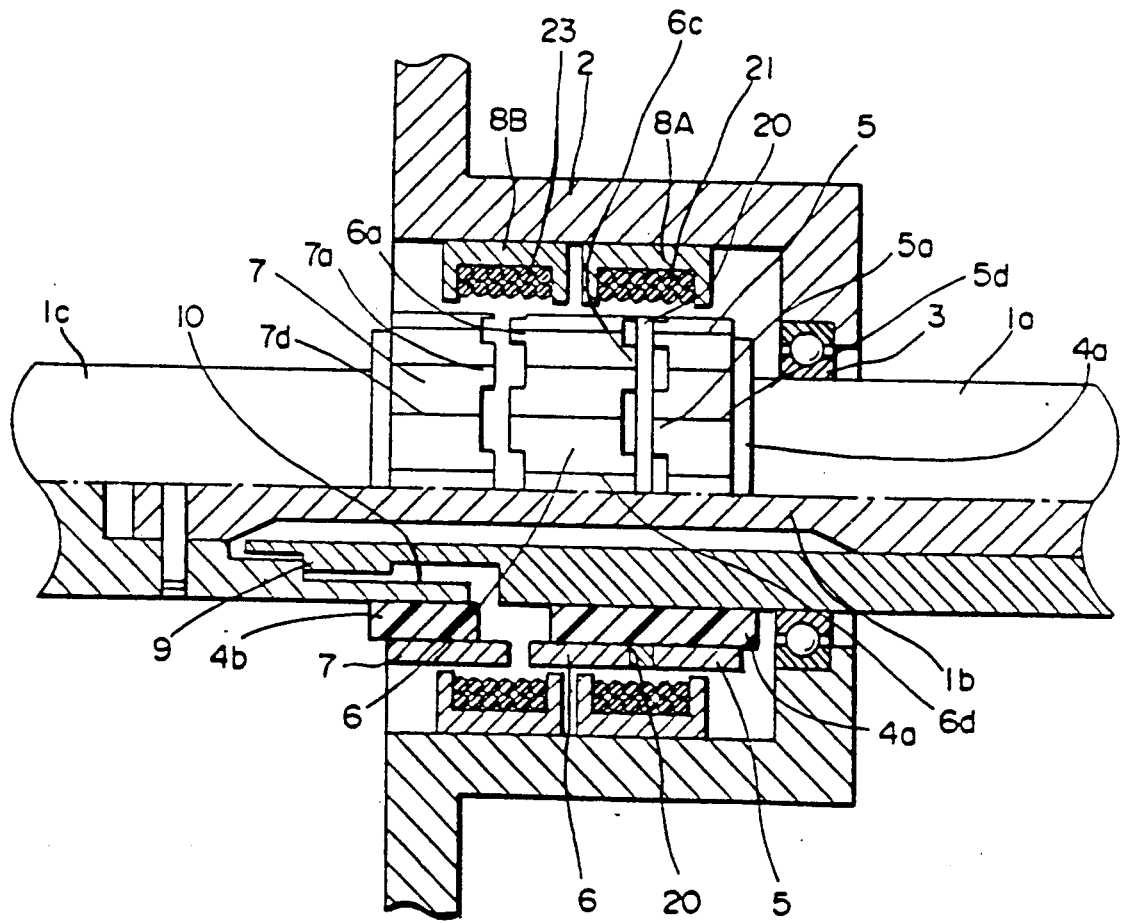
FIG. 8 is a half sectional view of structure of a fourth embodiment of the torque sensor of the invention.

FIG. 8 is a half sectional view of the third embodiment of the invention, in which an upper shaft 1a carrying a steering wheel (not shown) and a lower shaft 1c carrying a steering mechanism (not shown) are coaxially connected through a torsion bar 1b, the upper shaft 1a being rotatably supported through a bearing 3 on a cylindrical casing 2 fixed to a car body (not shown).

Onto the lower end (the left side in the drawing) of the upper shaft 1a is fixedly fitted a first sleeve 4a of a non-magnetic material and first and second cylinders 5 and 6 of a magnetic material are fixedly fitted onto the outer periphery of the first sleeve 4a. Between the first and second cylinders 5 and 6 is interposed a narrow ring-like-shaped spacer 20 made of non magnetic material, for example, brass, aluminum, or austenitic stainless steel, the spacer 20 being fitted on the outer periphery of the first sleeve 4a.

The upper end face of the first cylinder 5 is flat and perpendicular to the axis of the upper shaft 1a and at the lower end face of the same are provided a large number of teeth 5a of square and at circumferentially equal pitch. The utmost end face of each of teeth 5a are perpendicular to the axis of upper shaft 1a. Also, at the outer periphery of the cylinder 5 are provided a number of grooves 5d axially extending. The second cylinder 6 and a third one 7 are provided at the outer peripheries with grooves 6d and 7d the same as the grooves 5d.

The second cylinder 6 is provided at both axial end faces with teeth 6c and 6a the same in configuration and of the same pitch as the teeth 5a, each of teeth 6a and 6c being coincident with each other on the same line parallel to the axis. The teeth 6c and 5a, when the torsion bar 1b is not subjected to a torque, are opposite to each other at a portion of half width of each of teeth 6c or 5a, thus positioning the cylinders 5 and 6.

A second sleeve 4b of non-magnetic material is fixedly fitted onto the upper end of the lower shaft 1c and a third cylinder 7 of magnetic material is fitted onto the second sleeve 4b. The cylinder 7 is of the same configuration as the cylinder 5 and disposed axially reversely to the cylinder 5.

Accordingly, the teeth 6a of the second cylinder 6 are opposite to the teeth 7a of the third cylinder 7, both the teeth 6a and 7a being spaced at a proper axial interval. The teeth 6a and 7a, when no torque acts on the torsion bar 1b, are opposite to each other at the portion of half tooth width and in the same state as in the state of teeth 6c and 5a, thus positioning the cylinders 6 and 7.

At the outer periphery of the lower end of the upper shaft 1a is projected a stopper 9 extending in parallel to the axis of the upper shaft 1a. On the other hand, at the inner periphery of an opening coaxial with the upper end of the lower shaft 1c is formed a stopper guide groove 10 as shown in FIG. 7.

The stopper 9 engages with the stopper guide groove 10 so that the groove 10 is selected to have a circular arc length through which the upper and lower shafts 1a and 1c can relative-rotate only by, for example, half width of the teeth 6c.

Cylindrical members 8A and 8B of magnetic material and forming circumferential grooves are fixedly fitted inside the casing 2, the cylindrical member 8A being disposed opposite to the opposite portions at the first and second cylinders 5 and 6, the cylindrical member 8B being disposed opposite to the opposite portion at the second and third cylinders 6 and 7. In the circumferential grooves at the cylindrical members 8A and 8B are wound a first magnetic coupling detecting coil 21 and a second magnetic coupling detecting coil 23, so that the first magnetic coupling detecting coil 21 is electromagnetically coupled with the cylinders 5 and 6, the second magnetic coupling detecting coil 23 with those 6 and 7.

Thus, the axial end faces of the opposite cylinders 5 and 6 are coincident in configuration with that of cylinders 6 and 7, so that when the ambient temperature changes, the magnetic coupling state of the cylinders 5 and 6 and that of cylinders 6 and 7 similarly change and are properly temperature compensated, thereby causing no error in the output torque.

Meanwhile, the torque sensor positions the cylinder 5 in such a manner that at first the cylinders 6 and 7 are opposite to each other at a gap equal to width of the gap former 20 and fixed to the first and second sleeves 4a and 4b by use of adhesive at the position where the self impedance of the magnetic coupling detecting coil 23 becomes, for example, $I_R$. Thereafter, the cylinder 5 is rotated, while pushing it to the cylinder 6 through the gap former 20, and fixed to the first sleeve 4a by use of an adhesive or the like at the position where the self impedance of the magnetic coupling detecting coil 21 becomes $I_R$ as same as the above case. Hence, the magnetic coupling state of cylinders 5 and 6 equal to that of cylinders 6 and 7 can simply be obtained. Therefore, the time for positioning the cylinder 5 is largely reduced and trouble in operation is avoided.

In addition, the spacer 20 is non-magnetic material and does not at all affect the magnetic coupling of the cylinders 5 and 6.

A difference between the self impedances of the first and second magnetic coupling detecting coils 21 and 23 is obtained by, for example, a bridge circuit, so that a temperature change in the ambient temperature offsets the self impedances of the coils 21 and 23, thereby enabling detection of magnetic coupling state corresponding to the relative rotation amount of cylinders 6 and 7, and thereby properly detecting the torque acting on the torsion bar 1b. Also, the grooves 5d, 6d and 7d are formed on the outer surfaces of the cylinders 5, 6 and 7, whereby the magnetic flux flowing the cylinders 5, 6 and 7 cuts off a passage of a circumferentially flowing eddy current, thereby reducing an eddy current loss and a heat generation loss.

Alternatively, the spacer 20 may be provided at both side surfaces with projections engageable with the teeth 5a or 6c. In this case, the spacer 20 can determine the opposite area of the opposite teeth.

Figure 9:
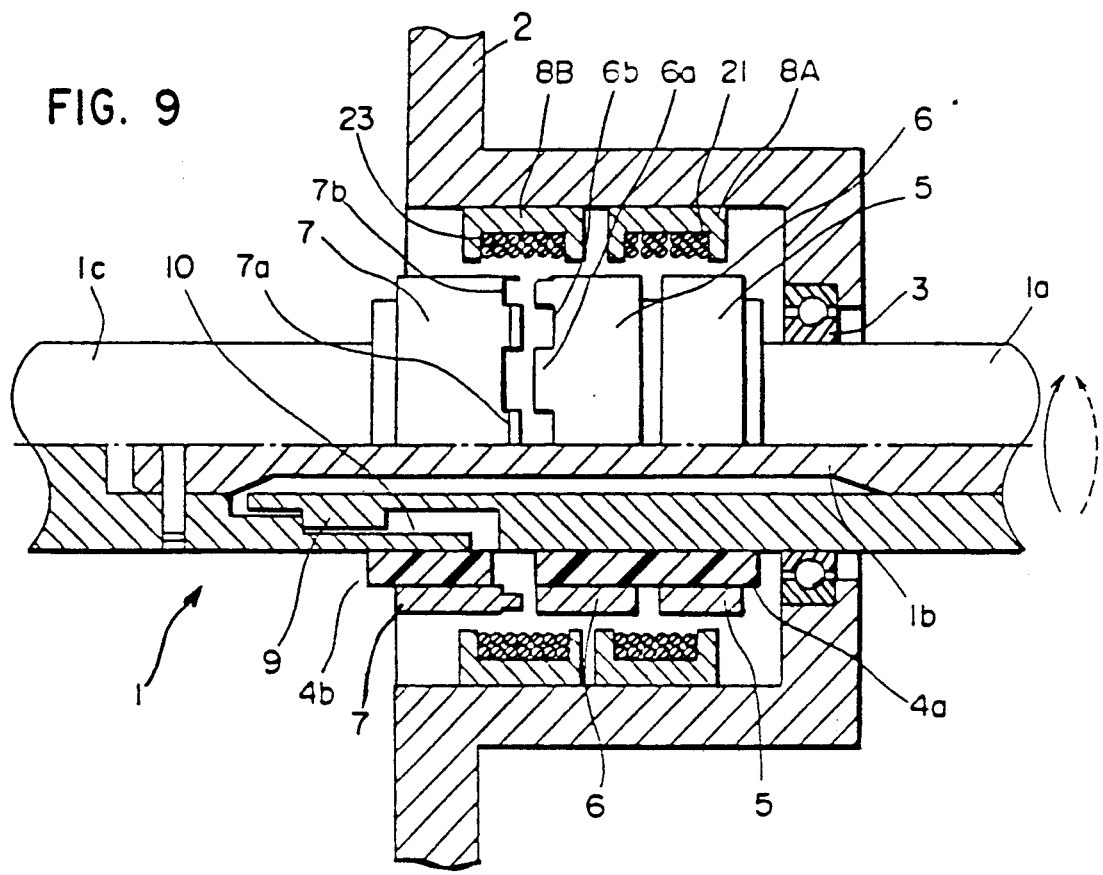
FIG. 9 is a half sectional view of structure of a fifth embodiment of the torque sensor of the invention.

Next, explanation will be given on a fourth embodiment of the torque sensor of the invention. FIG. 9 is a half sectional view thereof, in which the fourth embodiment is about the same as the second embodiment shown in FIG. 5, but different therefrom is that each of teeth 7a at a third cylinder 7 are smaller in thickness than each of teeth 6a at a second cylinder 6. Hence, even when the torsion bar 1b is deflected, the opposite area between the teeth 7a and 6a is unchanged, thereby always detecting only the torque and not lowering the detection accuracy.

Figure 10:
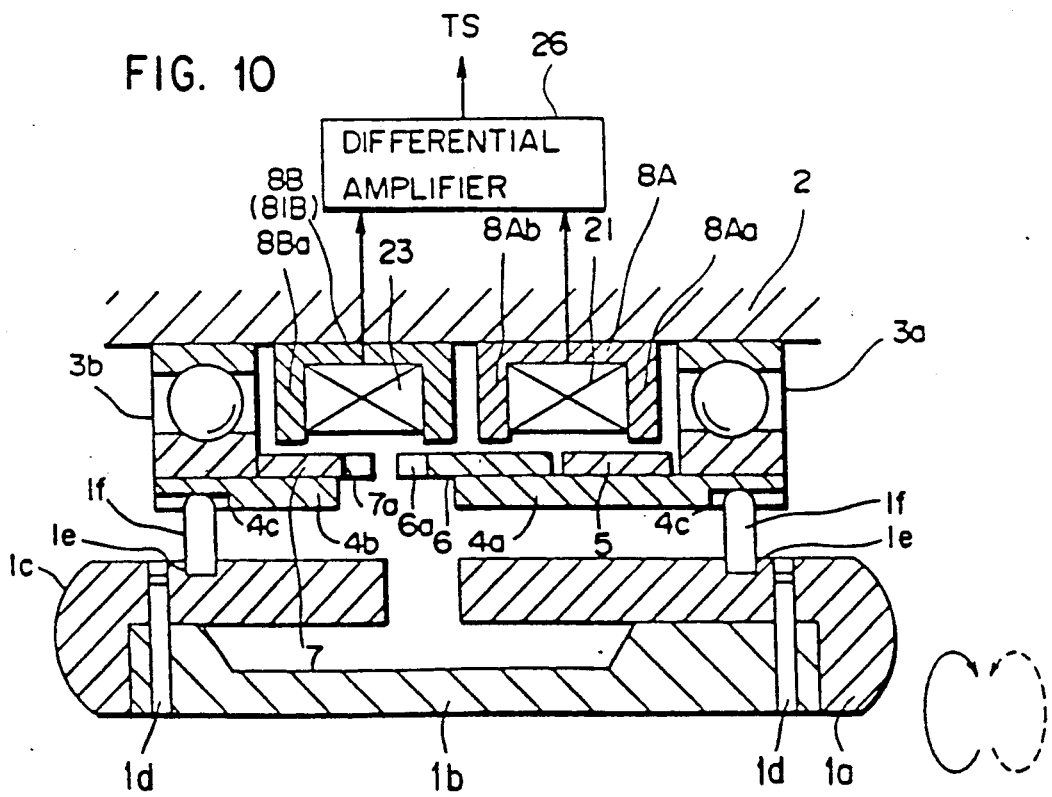
FIG. 10 is a half sectional view of structure of a sixth embodiment of the torque sensor of the invention.

FIG. 10 is a half sectional view of a fifth embodiment of the invention, in which an upper shaft 1a carrying a steering wheel (not shown) and a lower shaft 1c carrying a steering mechanism (not shown) are coaxially connected by pins 1d inserted into the shafts 1a and 1c through the torsion bar 1b. At the outer peripheries of the upper and lower shafts 1a and 1c are formed a plurality of pin insertion bores 1e each spaced at a proper length from the utmost end. Short pins 1f are inserted at one of its ends into the bores 1e respectively. A casing 2, into which the upper and lower shafts 1a and 1c are inserted, is fixed to the car body (not shown) and provided at the inner periphery with bearings 3a and 3b apart from the opposite ends of the upper and lower shafts 1a and 1c at about axially equal length. At the inner peripheries of bearings 3a and 3b are fixed cylindrical members 4a and 4b, each of non-magnetic material and of a somewhat larger inner diameter than the outer diameter of upper shaft 1a, and the members 4a and 4b are spaced at one of the opposite ends in a proper length. At the inner peripheries of cylindrical members 4a and 4b and at the positions corresponding to the pins 1f are formed pin guide grooves 4c and 4c of a width and depth sufficient to engage with the pins 1f. The pin guide grooves 4c, 4c extend in parallel to the axes of the cylindrical members 4a and 4b and have a proper length from the utmost ends thereof. The pins 1f slidably engage at the other ends with the pin guide grooves 4c and 4c respectively, the other ends of the same being formed in circular arc to be smoothly slidable. Therefore, the torque of upper shaft 1a is transmitted to the cylindrical member 4a through the pin 1f and that of lower shaft 1c to the cylindrical member 4a through the pin 1f, thereby allowing the cylindrical members 4a and 4b to associate with the upper and lower shafts 1a and 1c respectively.

Onto the outer periphery of the cylindrical member 4a is fixedly fitted first and second cylinders 5 and 6 axially spaced from each other at a proper length, the cylinder 5 having the axially end faces flat and perpendicular to the axis of upper shaft 1a.

One axially end face of the cylinder 6 opposite to the cylinder 5 is flat and perpendicular to the axis of upper shaft 1a and the other end face is the plane non-perpendicular to the axis thereof and forms teeth 6a.

Onto the cylindrical member 4b is fixedly fitted a third cylinder 7 of magnetic material. The cylinder 7 is equal in the size and configuration to the cylinder 6 and opposite at the slanted end face to the axial end face of cylinder 6 having teeth 6a and spaced from each other at a proper interval, thereby positioning the cylinder 7. A cylindrical member 8A of magnetic material having inward flanges 8Aa and a cylindrical member 8B of magnetic material having inward flanges 8Ba are fixed to the inner periphery of the casing 2 between the bearings 3a and 3b. The cylindrical member 8A is disposed across the cylinders 5 and 6 and the cylindrical member 8B across the cylinders 6 and 7. Both the members 8A and 8B are axially spaced at a proper interval. Also, the cylindrical members 8A and 8B contain in the inner peripheral grooves thereof a temperature compensating coil 21 and a magnetic coupling detecting coil 23 wound at proper turns along the grooves. The temperature compensating coil 21 and the magnetic coupling detecting coil 23 are connected to a differential amplifier 26 as shown in FIG. 3, and the output thereof serving as a torque output TS.

Next, explanation will be given on the operation of the torque sensor of the invention. The magnetic flux generated in the temperature compensating coil 21 and magnetic coupling detecting coil 23 by means of oscillation of the oscillator (not shown) interlinks the cylinders 5 and 6 and those 6 and 7.

When the steering wheel is rotated, the torsion bar 1b acts to rotate the cylinder 6 relative to the cylinder 7. Then, the cylinders 5 and 6 rotate together with the cylindrical members 4a, 4b through the pins 1f, so that the opposite area of the teeth 6a and 7a changes to change magnetic coupling, thereby changing the self impedance of the magnetic coupling detecting coil 23. However, since the magnetic coupling between the cylinders 5 and 6 is constant, the self impedance of temperature compensating coil 21 is constant and the output of the differential amplifier 26 becomes a value corresponding to the aforesaid relative rotation amount.

The relative rotation amount is decided by a torque applied to the upper shaft 1a by the steering wheel, whereby lastly the output of differential amplifier 26 can detect the torque.

The cylinders 6 and 7 are fixedly fitted onto the cylindrical members 4a and 4b respectively, which are fixed to the bearings 3a and 3b respectively, that is, the cylindrical members 4a and 4b are not fitted onto the shafts 1a and 1c. The cylindrical members 4a, 4b have axial pin guide grooves 4c, 4c. The pins 1f, 1f, which are fixed to the upper and lower shafts 1a, 1c, are engaged in the pin guide grooves 4c, 4c slidably in the axial direction of the shafts 1a, 1c. The rotation of the shafts 1a, 1c is transmitted to the cylindrical members 4a, 4b via this engagement.

Therefore, even when the torsion bar 1b deflects, the pins 1f, 1f slide in the grooves 4c, 4c and the deflecting force is not applied to the cylindrical members 4a and 4b. Thus, the opposite area between the cylinders 6 and 7 does not at all change by the deflection, although the torsion bar 1b rotates with grinding movement.

Upon rotation of the upper shaft 1a, the cylindrical member 4a and cylinder 6 are accurately rotated through the pins 1f.

Accordingly, the torque sensor of the present invention is not at all affected by deflection of the torsion bar. It always detects only the torque acting on the torsion bar. Hence, a torque sensor of high detection accuracy can be provided.

Figure 11:
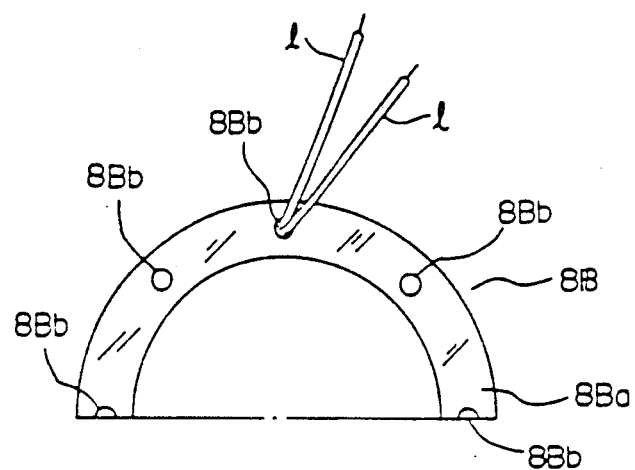
FIG. 11 is a half side view of structure of a cylindrical member at the fourth embodiment of the torque sensor of the invention.
Figure 12:
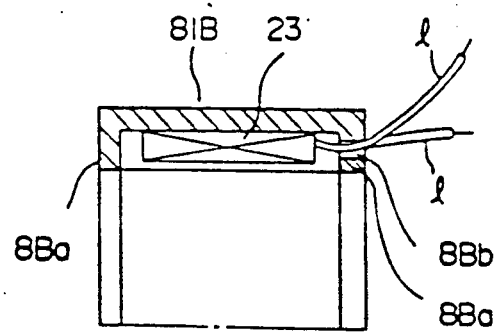
FIG. 12 is a half sectional view of structure of the cylindrical member of the fourth embodiment of the torque sensor of the invention.

FIGS. 11 and 12 are respectively a half side view and a half sectional view of the torque sensor of the invention, in which through bores 8Bb of proper size are disposed and circumferentially equally divided into eight at one inward flange 8Ba at the cylindrical member 81B of magnetic material and of U-line shape in section and wound with the coil 23 (see FIG. 12) constituting the magnetic flux generating unit. The respective through bores 8Bb are of the same configuration and size. Into one through bore 8Bb, lead wires 1 connecting with the ends of coil 23 are inserted and taken out to the extension.

Thus, when the plurality of through bores 8Bb circumferentially spaced at equal interval are provided at the inward flange 8Ba, a sectional area of the inward flange can circumferentially be averaged in comparison with the single through bore 8Bb, thereby averaging the magnetic flux density.

The cylindrical member 81B thus constituted is used instead of the conventional cylindrical member 8B shown in FIG. 2, which is fixed at the inner periphery of the casing 2. Hence, the magnetic flux from the inward flange 8Ba at the cylindrical member 81B passes between the opposite end faces of cylinders 6 and 7 to generate at the coil 23 voltage corresponding to each gap. When the upper shaft 1a is rotated to apply a torque to the torsion bar 1b, a gap between the opposite end faces of the cylinders 6 and 7 changes to change the self impedance of the coil 23, thereby detecting the torque.

On the other hand, when the torsion bar 1b deflects, the gap between the cylinders 6 and 7 changes circumferentially in part, since the circumferential magnetic flux density of the inward flange 8Ba of the cylindrical member 81B is averaged as above-mentioned, the self impedance of the coil 23 is not changed, thereby enabling error detection to be prevented. Also, an eddy current loss produced in the inward flange 8Ba can be restricted.

In this embodiment, the through bores 8Bb are disposed in th equally eight-divided positions, which are of course exemplary only. Each through bore 8Bb may of course be about circumferentially equally divided. Furthermore, the cylindrical member 81B may have outward flanges, in which the same effect is obtainable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A torque sensor comprising:
   first and second shafts which are connected through a torsion bar;
   a first cylinder of magnetic material attached to said first shaft;
   a second cylinder of magnetic material attached to said second shaft, the magnetic coupling state thereof with said first cylinder changing in response to a relative rotation of said shafts with respect to each other;
   a coil for detecting a change in said magnetic coupling state between said first and second cylinders;
   a compensating coil for compensating for temperature variations of said change in said magnetic coupling state detected by said detecting coil; and
   means for detecting the magnetic coupling state corresponding to a relative rotation of said first and second cylinders and thereby a torque acting on said torsion bar, said detecting means including means for detecting changes of self impedances of said coils, said compensating coil being free of detecting any change caused by the torque.

2. A torque sensor as set forth in claim 1, further comprising;
   a plurality of bearings coaxial with said first and second shafts and axially spaced from each other and fixedly fitted into a casing, and
   two cylindrical members of non-magnetic material fixedly fitted into said bearings, said cylinders being separately fixedly fitted onto respective ones of said cylindrical members.

3. A torque sensor as set forth in claim 1, wherein said compensating coil is responsive to a change in a magnetic coupling state between a third cylinder and said second cylinder, said third cylinder being made of magnetic material and attached to said second shaft so that the second and third cylinders are rotatable together without relative rotation and the magnetic coupling state between said second and third cylinders varies in response to variations in temperature only.

4. A torque sensor as set forth in claim 3, wherein said first, second and third cylinders are provided at the outer peripheries thereof with a large number of grooves extending axially of said cylinders respectively.

5. A torque sensor as set forth in claim 3, wherein said first and second cylinders are opposite to each other at the axial end edges, one of which being smaller in thickness than the other.

6. A torque sensor as set forth in claim 3, wherein said detecting coil constitutes a first magnetic coupling detecting coil coupled electromagnetically between said first and second cylinders, said compensating coil constituting a second magnetic coupling detecting coil that is coupled electromagnetically between said second and third cylinders.

7. A torque sensor as set forth in claim 3, wherein said detecting coil includes a cylindrical member having flanges and a large number of through-going bores formed at one side of said flanges and disposed circumferentially thereof, and a further coil wound at an inner periphery of said cylindrical member, lead wires of said further coil being inserted through said through-going bores.

8. A torque sensor as set forth in claim 3, wherein said first and second cylinders are provided at the opposite end edges thereof with a large number of cutouts so as to form teeth disposed circumferentially of said cylinders.

9. A torque sensor as set forth in claim 8, wherein said teeth at said first and second cylinders are smaller in width respectively than respective said cutouts.

10. A torque sensor as set forth in claim 9, wherein said teeth at said first and second cylinders, when said torsion bar is subjected to no torque, are opposite to each other at a portion of about a half width of each tooth.

11. A torque sensor as set forth in claim 10, further comprising means for regulating said first and second shafts in a rotation range which excludes a state where said teeth of said first and second cylinders are completely opposite or non-opposite to each other.

12. A torque sensor as set forth in claim 8, wherein said second and third cylinders are provided at the opposite axial end edges thereof with a large number of cutouts so as to form teeth disposed circumferentially of said cylinders.

13. A torque sensor as set forth in claim 3, further comprising a spacer made of non-magnetic material, interposed between the opposite axial end edges of said second and third cylinders.

* * * * *